(12) United States Patent
Tam et al.

(10) Patent No.: US 8,697,220 B2
(45) Date of Patent: Apr. 15, 2014

(54) HIGH STRENGTH TAPE ARTICLES FROM ULTRA-HIGH MOLECULAR WEIGHT POLYETHYLENE

(75) Inventors: Thomas Tam, Chesterfield, VA (US); Mark Benjamin Boone, Mechanicsville, VA (US); Steven Thomas Correale, Chester, VA (US)

(73) Assignee: Honeywell International, Inc., Morristown, NJ (US)

( * ) Notice: Subject to any disclaimer, the term of this patent is extended or adjusted under 35 U.S.C. 154(b) by 451 days.

(21) Appl. No.: 13/021,262

(22) Filed: Feb. 4, 2011

(65) Prior Publication Data

US 2012/0121852 A1 May 17, 2012

Related U.S. Application Data

(63) Continuation-in-part of application No. 12/539,185, filed on Aug. 11, 2009, now Pat. No. 8,236,119.

(51) Int. Cl.
*D03D 15/00* (2006.01)
*D04B 1/00* (2006.01)

(52) U.S. Cl.
USPC .......... 428/105; 139/383 R; 428/98; 428/156; 428/213; 428/364; 442/135

(58) Field of Classification Search
USPC ................ 428/105, 107, 156, 213, 364, 98; 139/383 R; 442/135
See application file for complete search history.

(56) References Cited

U.S. PATENT DOCUMENTS

| 4,413,110 A | 11/1983 | Kavesh et al. |
| 4,623,574 A | 11/1986 | Harpell et al. |

(Continued)

FOREIGN PATENT DOCUMENTS

| EP | 1627719 A1 * | 7/2005 | .............. B29C 43/00 |
| WO | 2006/074823 A1 | 7/2006 | |
| WO | 2007/107359 A1 | 9/2007 | |
| WO | 2009/056286 A1 | 5/2009 | |

OTHER PUBLICATIONS

Richard S. Stein, "The X-Ray Diffraction, Birefringence, and Infrared Dichroism of Stretched Polyethylene. II. Generalized Uniaxial Crystal Orientation," Journal o Polymer Science, vol. XXXI, pp. 327-334, 1958.

(Continued)

*Primary Examiner* — Brent O'Hern

(57) ABSTRACT

Tape articles having improved properties are made from ultra-high molecular weight (UHMW) multi-filament yarns. The tape articles can have a ratio of the low temperature area under the curve (120° C. to Tm-onset) to the total area under the curve (120° C. to 165° C.) of less than about 0.15 as calculated from an increasing temperature DSC scan from a temperature of 30° C. to a temperature of 200° C. at a constant rate of 10° C. per minute. Additionally, in some examples the tape articles can also have a tenacity at least about 24 g/d (2.06 GPa) when measured by ASTM D882-09 at a 10 inch (25.4 cm) gauge length and at an extension rate of 100%/min. Further, the tape articles can have no long period of less than 450 Angstroms (Å) when measured by small angle x-ray analysis.

17 Claims, 5 Drawing Sheets

(56) References Cited

U.S. PATENT DOCUMENTS

| | | | |
|---|---|---|---|
| 4,748,064 A | 5/1988 | Harpell et al. | |
| 4,819,458 A | 4/1989 | Kavesh et al. | |
| 4,996,011 A | 2/1991 | Sano et al. | |
| 5,091,133 A | 2/1992 | Kobayashi et al. | |
| 5,106,555 A | 4/1992 | Kobayashi et al. | |
| 5,135,804 A | 8/1992 | Harpell et al. | |
| 5,200,129 A | 4/1993 | Kobayashi et al. | |
| 5,540,990 A | 7/1996 | Cook | |
| 5,578,373 A | 11/1996 | Kobayashi et al. | |
| 5,628,946 A | 5/1997 | Ward et al. | |
| 5,749,214 A | 5/1998 | Cook | |
| 6,017,834 A | 1/2000 | Ward et al. | |
| 6,148,597 A | 11/2000 | Cook | |
| 6,328,923 B1 | 12/2001 | Jones et al. | |
| 6,458,727 B1 | 10/2002 | Jones et al. | |
| 6,743,388 B2 | 6/2004 | Sridharan et al. | |
| 6,951,685 B1 * | 10/2005 | Weedon et al. | 428/364 |
| 7,279,441 B2 | 10/2007 | Jones et al. | |
| 7,311,963 B2 | 12/2007 | Mokveld et al. | |
| 7,407,900 B2 | 8/2008 | Cunningham | |
| 7,470,459 B1 | 12/2008 | Weedon et al. | |
| 7,740,779 B2 | 6/2010 | Harding et al. | |
| 2002/0037391 A1 * | 3/2002 | Harpell et al. | 428/103 |
| 2008/0064280 A1 | 3/2008 | Bhatnagar et al. | |
| 2008/0251960 A1 | 10/2008 | Harding et al. | |
| 2008/0318016 A1 | 12/2008 | Weedon et al. | |
| 2009/0117805 A1 | 5/2009 | Simmelink et al. | |
| 2009/0181211 A1 | 7/2009 | Lang et al. | |
| 2010/0178503 A1 | 7/2010 | Tam et al. | |

OTHER PUBLICATIONS

Akira Kaito et al., "Hot Rolling and Quench Rolling of Ultrahigh Molecular Weight Polyethylene," Journal of Applied Polymer Science, vol. 28, pp. 1207-1220, 1983.

Akira Kaito et al., "Preparation of High Modulus Polyethylene Sheet by the Roller-Drawing Method," Journal of Applied Polymer Science, vol. 30, pp. 1241-1255, 1985.

Akira Kaito et al., "Roller Drawing of Ultrahigh Molecular Weight Polyethylene," Journal of Applied Polymer Science, vol. 30, pp. 4591-4608, 1985.

Li-Hui Wang et al., "New approach for processing ultrahigh-molecular weight polyethylene powder. Solid-state rolling followed by hot stretch (roll-draw)," Journal of Polymer Science, Part B: Polymer Physics, vol. 28, No. 12, pp. 2441-2444, Nov. 1990 (Abstract only).

R.J. Yan et al., "The hot compaction of SPECTRA gel-spun polyethylene fibre," Journal of Materials Science, vol. 32, pp. 4821-4831, 1997.

S.T. Correale et al., "Secondary Crystallization and Premelting Endo- and Exotherms in Oriented Polymers," Journal of Applied Polymer Science, vol. 101, pp. 447-454, 2006.

Eunji Lee et al., "Rigid-flexible block molecules based on a laterally extended aromatic segment: Hierarchical assembly into single fibers, flat ribbons, and twisted ribbons," Chemistry—A European Journal, vol. 14, No. 23, pp. 6957-6966, Aug. 8, 2008.

Takashi Nakahara et al., "Ultra High Molecular Weight Polyethylene Blown Film Process," ANTEC 2005, 178-181 (2005).

Yachin Cohen et al., "A Novel Composite Based on Ultra-High-Molecular-Weight Polyethylene," *Composites Science and Technology*, 57, 1149-1154 (1997).

* cited by examiner

HIGH STRENGTH TAPE ARTICLES FROM ULTRA-HIGH MOLECULAR WEIGHT POLYETHYLENE

RELATED APPLICATIONS

This application is a continuation in part of U.S. patent application Ser. No. 12/539,185, filed on Aug. 11, 2009, now U.S. Pat. No. 8,236,119.

FIELD OF THE PRESENT TECHNOLOGY

The present technology relates to tape articles made from ultra-high molecular weight polyethylene (UHMWPE) multi-filament yarns, and also relates to fabrics, laminates and impact resistant materials that can be made from such tape articles.

DESCRIPTION OF RELATED ART

Impact resistant and penetration resistant materials find uses in many applications such as sports equipment, safety garments, and most critically, in personal body armor.

Various fiber-reinforced constructions are known for use in impact-resistant, ballistic-resistant and penetration-resistant articles such as helmets, panels, and vests. These articles display varying degrees of resistance to penetration by impact from projectiles or knives, and have varying degrees of effectiveness per unit of weight.

For example, a measure of the ballistic-resistance efficiency is the energy removed from a projectile per unit of the target's areal density. This is known as the Specific Energy Absorption, abbreviated as "SEA", and having units of Joules per $Kg/m^2$ or $J\text{-}m^2/Kg$. The SEA of a fibrous construction is known to generally increase with increasing strength, tensile modulus and energy-to-break of the constituent fibers. However, other factors, such as the shape of the fibrous reinforcement, may come into play. U.S. Pat. No. 4,623,574, presents a comparison between the ballistic effectiveness of a composite constructed with a ribbon-shaped reinforcement versus one using a multi-filament yarn: both of ultra-high molecular weight polyethylene (UHMW PE). The fiber had a higher tenacity than the ribbon: 30 grams/denier (g/d) (2.58 GPa) versus 23.6 g/d (2.03 GPa). Nevertheless, the SEA of the composite constructed with the ribbon was somewhat higher than the SEA of the composite constructed with the yarn. U.S. Pat. No. 4,623,574 thus indicates that a composite constructed with a ribbon-shaped reinforcement can be more effective than a multi-filament yarn in producing ballistic resistant composites.

One example of the preparation of UHMWPE melt-blown film is provided by Takashi Nakahara et al., "Ultra High Molecular Weight Polyethylene Blown Film Process," ANTEC 2005, 178-181 (2005). Film made by this process was slit and drawn to make a high strength tape. The tenacity of the tape made from the stretched blown film was less than 20 g/d (1.72 GPa).

U.S. Pat. Nos. 5,091,133; 5,578,373; 6,951,685; 7,740,779, disclose polyethylene powder being compressed at elevated temperature to bond the particles into a continuous sheet that is then further compressed and stretched. U.S. Pat. No. 5,091,133 describes a fiber made by this latter process having a tensile strength of 3.4 GPa. Polyethylene tapes so produced are commercially available under the trademark TENSYLON® by BAE Systems. The highest tenacity reported on the TENSYLON® web site is 19.5 g/d (tensile strength of 1.67 GPa).

An example describing the preparation of a UHMWPE composite made from Spectra® fiber is provided by Yachin Cohen et al., "A Novel Composite Based on Ultra-High-Molecular-Weight Polyethylene", Composites Science and Technology, 57, 1149-1154 (1997). Spectra® fibers under tension were treated with a solvent in order to swell the fiber surface and promote adhesion between fibers while forming a prepreg. The yarn prepreg was then wound on a plate to produce unidirectional layers which were then pressed and heated and the solvent removed to yield a composite sheet material containing UHMWPE fiber in a re-crystallized UHMWPE matrix formed from the previously dissolved fiber surfaces. The researchers state that the unique properties of UHMWPE make it a desirable candidate for a matrix material to be used with UHMWPE fibers; however, this had not been possible before the use of their solvent-based process for several reasons: 1) The difference in the melting temperatures of the oriented UHMWPE fibers and the unoriented UHMWPE matrix is too small, 2) The extremely high melt viscosity of UHMWPE results in negligible melt flow in molding processes for formation of the composite materials, 3) The relatively poor adhesion of untreated UHMWPE fibers to UHMWPE matrix.

U.S. Pat. No. 5,135,804 describes high strength plaques made by heating and pressing unidirectionally aligned gel-spun polyethylene fibers without any solvent or resin treatment of the fibers before pressing. Example plaques were formed by winding fibers around a 3-inch square metal plate and then pressing the assembly for several minutes in a heated press. The hot-pressed UHMWPE plaques were substantially free of voids and essentially transparent.

U.S. Pat. No. 5,628,946 describes a homogeneous polymeric monolith made from thermoplastic polymer fibers which were first pressed into contact with each other at an elevated temperature adequate to selectively melt a portion of the polymer fibers and then pressed at a second higher pressure at the elevated temperature to further consolidate the material. An example of a monolithic sheet of dimensions 3 mm by 55 mm by 55 mm made from Spectra® fiber is given, in which a unidirectionally aligned bundle of the fibers was pressed in a mold at 152° C. for 10 minutes at a first pressure and 30 seconds at a higher pressure. It is stated that a DSC trace of the pressed sheet showed around 35% of a 'second phase' formed by melting of the original fiber.

SUMMARY OF THE PRESENT TECHNOLOGY

The present technology generally relates to tape articles made from ultra-high molecular weight polyethylene multi-filament yarns. The tape articles of present technology can be made in a continuous process from highly oriented UHMWPE multi-filament yarns in such a way that the high strength of the yarn is substantially retained in the tape articles.

In one aspect a tape article made from ultra-high molecular weight polyethylene multi-filament yarn is provided, where the tape article includes an average cross-sectional aspect ratio of at least about 10:1, and a ratio of the low temperature area under the curve (120° C. to Tm-onset) to the total area under the curve (120° C. to 165° C.) of less than about 0.15 as calculated from an increasing temperature DSC scan from a temperature of 30° C. to a temperature of 200° C. at a constant rate of 10° C. per minute. In some examples the tape articles can also have a tenacity at least about 24 g/d (2.07 GPa) when measured by ASTM D882-09 at a 10 inch (25.4 cm) gauge length and at an extension rate of 100%/min. Further, the tape articles can have no long period of less than 450 Angstroms (Å) as measured by small angle x-ray analysis.

BRIEF DESCRIPTION OF THE DRAWINGS

Specific examples have been chosen for purposes of illustration and description, and are shown in the accompanying drawings, forming a part of the specification.

DETAILED DESCRIPTION

Figure 1:
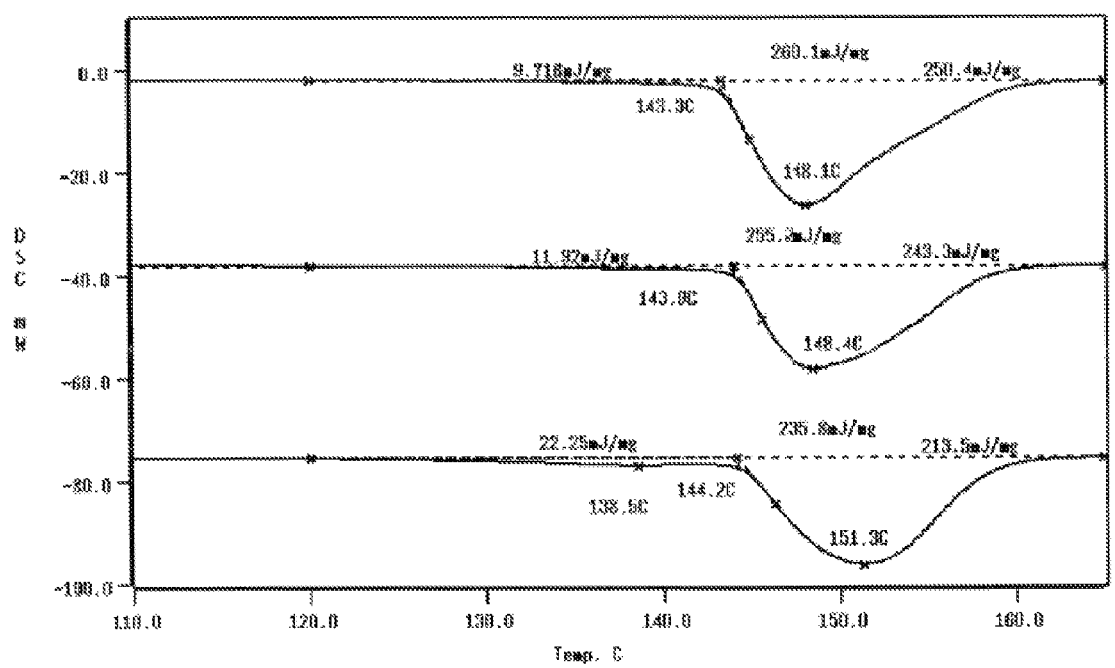
FIG. 1 illustrates DSC data for three test samples made from tape articles of the present technology, with the X-axis being the temperature (° C.), the Y-Axis being the DSC mW, and the calculated areas indicated in mJ/mg.

A tape article is defined as a substantially flat elongate article having a length greater than its width, and preferably having a length substantially greater than its width at least when the tape article is manufactured, although the length can be substantially reduced when the tape article is cut for various purposes.

Tape articles of the present technology can be differentiated from currently known tapes by their width. For example, known tapes of substantial length are described as being up to 6 mm in width. In contrast, tape articles of the present invention can have a width of that is greater than about 10 mm, greater than about 100 mm, or greater than about 1000 mm.

The height, or thickness, of a tape article can be, for example, less than about 0.5 millimeters, less than about 0.25 millimeters, less than about 0.1 millimeters, or less than about 0.05 millimeters (2 mils). The height can be measured at the thickest region of the cross-section of a tape article.

In some examples, a tape article can have an average cross-sectional aspect ratio of at least about 10:1. The average cross-sectional aspect ratio is the ratio of the greatest to the smallest dimension of cross-sections, which is generally the ratio of the width to the height, averaged over the length of the tape article. For example, the average cross-sectional aspect ratio can be determined by averaging the cross-sectional aspect ratio determined for at least three locations along the length of the tape article. In some examples, a tape article can have an average cross-sectional aspect ratio at least about 20:1, at least about 50:1, at least about 100:1, at least about 250:1, at least about 400:1, or at least about 1000:1. In some examples, a tape article can have a constant cross-sectional aspect ratio along its length. In other examples, a tape article can have a variable cross-sectional aspect ratio that changes randomly or at a selected frequency along its length.

The cross-section of a tape article can be any suitable shape, including but not limited to a rectangle, an oval, a polygon, an irregular shape, or any other shape satisfying the width, thickness and cross-sectional aspect ratio properties described above. In one example, a tape article can have a cross section that is a rectangle, or that is essentially or substantially a rectangle, with some irregularity permitted given the constraints of the process for making exact or consistent dimensions. In other examples, the tape article may have a variable cross-section shape that changes randomly or at a selected frequency along its length. Additionally, the tape article may have a variable level of fiber consolidation along its length, with consolidation changing randomly or at a selected frequency. Fiber consolidation refers to the degree to which the fibers or filaments of UHMWPE are fused together.

Tape articles of the present technology can be formed from UHMWPE fibers, or filaments, and are preferably formed from UHMWPE multi-filament yarns. The UHMWPE yarn selected as a feed for forming a tape article can be prepared by any suitable method. For example, the selected UHMWPE yarn can be prepared by "gel spinning" Gel spun UHMWPE yarns are commercially available, for example, from Honeywell International under the trade name SPECTRA®, from DSM N.V. and Toyobo Co. Ltd. under the trade name DYNEEMA®, and from others. As another example, the selected UHMWPE yarn can be prepared by melt spinning. One such melt spinning process is described in U.S. Publication No. 20100178503, the disclosure of which is hereby incorporated by reference in its entirety.

The UHMW PE yarn selected as a feed for making tape articles of the present technology can have an intrinsic viscosity when measured in decalin at 135° C. by ASTM D1601-99 of from about 7 dl/g to about 40 dl/g, from about 10 dl/g to about 40 dl/g, from about 12 dl/g to about 40 dl/g, or from about 14 dl/g to 35 dl/g.

The UHMW PE yarn selected as a feed for a tape article can be highly oriented. A highly oriented UHMW PE yarn is defined as having a c-axis orientation function at least about 0.96, preferably at least about 0.97, more preferably at least about 0.98 and most preferably, at least about 0.99. C-axis orientation function (fc) can be measured by the wide angle x-ray diffraction method described in Correale, S. T. & Murthy, Journal of Applied Polymer Science, Vol. 101, 447-454 (2006) as applied to polyethylene. As disclosed therein, the c-axis orientation function is a description of the degree of alignment of the molecular chain direction with the fiber direction and is calculated from the equation:

$$f_c = \frac{1}{2}(3 <\cos\theta>^2 -1)$$

where θ is the angle between the c-axis of the polyethylene crystals (the molecular chain direction) and the fiber direction and the carets indicate the average of the quantity therebetween.

The average cosine of the angle between the "c" crystal axis and the fiber direction can be measured by well known x-ray diffraction methods. A polyethylene fiber in which the molecular chain direction is perfectly aligned with the fiber axis would have a $f_c=1$.

The UHMW PE yarn selected as a feed for a tape article can have a tenacity from about 15 g/d (1.29 GPa) to about 100 g/d (8.62 GPa), from about 25 g/d (2.15 GPa) to about 100 g/d (8.62 GPa), from about 30 g/d (2.59 GPa) to about 100 g/d (8.62 GPa), from about 35 g/d (3.02 GPa) to about 100 g/d (8.62 GPa), from about 40 g/d (3.45 GPa) to about 100 g/d (8.62 GPa), or from about 45 g/d (3.88 GPa) to about 100 g/d (8.62 GPa).

The UHMW PE yarn selected as a feed for a tape article can be untwisted or twisted. Preferably the selected UHMW PE yarn has less than about 3 turns of twist per inch of length.

The selected UHMW PE yarn can additionally be heat set by a process described in U.S. Pat. No. 4,819,458 hereby incorporated by reference to the extent not incompatible herewith.

The selected UHMW PE yarn can consist of unconnected filaments, or the filaments can be at least partially connected by fusion or by bonding. Fusion of UHMW PE yarn filaments can be accomplished in any suitable manner such as, for example, the use of heat and tension, or through application of a solvent or plasticizing material prior to exposure to heat and tension as described in U.S. Pat. Nos. 5,540,990; 5,749,214; and 6,148,597, which are hereby incorporated by reference to the extent not incompatible herewith.

Figure 5:
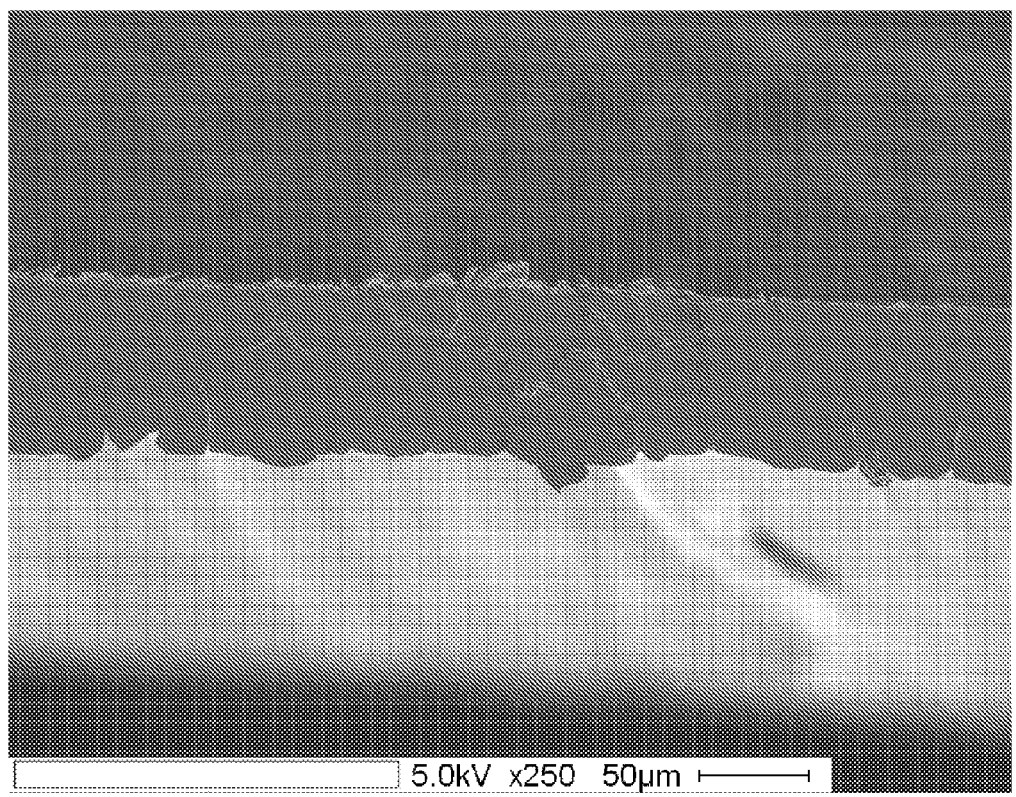
FIG. 5 illustrates an SEM micrograph of a cross-section of a tape article of the present technology.

Tape articles of the present technology have improved properties over currently known tape articles, as evidenced by various properties. For example, when calculated from an increasing temperature DSC scan from a temperature of 30° C. to a temperature of 200° C. at a constant rate of 10° C. per minute, the tape articles preferably have a ratio of the low temperature area under the curve (120° C. to Tm-onset) to the total area under the curve (120° C. to 165° C.) of less than about 0.15, and more preferably less than about 0.05. The Tm-onset can be determined from the line drawn from the peak temperature tangent to the melting endotherm and its intersection with the constructed baseline, in accordance with ASTM F2625-10. Additionally, tape articles preferably have no long period of less than 450 Angstroms (Å) as measured by small angle x-ray analysis. Methods that can be used to measure these properties are provided below. These properties, either alone or in combination, can be used as an indication that a tape article made from high strength multi-filament yarn has a desirably low amount of recrystallized polyethylene content. Recrystallized polyethylene content can generally result from surface melting and subsequent recrystallization of polyethylene fibers during the making of tape articles. It is unexpected to be able to form UHMWPE tape articles with such a small amount of recrystallized polyethylene content, particularly UHMWPE tape articles that are well consolidated and void free, or substantially free of voids, as is preferred for tape articles of the present technology. Voids exist in tape articles as holes in the tape article, and can generally result from spaces between the filaments or fibers used to the make the tape. A void free, or substantially void free tape article can have a translucent or transparent optical appearance, whereas a tape that has a significant void content tends to scatter light, thus creating an opaque optical appearance. In some examples, tape articles of the present technology can be translucent, thus allowing light to pass diffusely therethrough. Some tape articles of the present technology can even be transparent, thus providing an optically clear appearance. FIG. 5 shows an SEM micrograph of a cross-section of a tape of the present technology. The original yarn filaments have been highly consolidated such that there is no observable space between them. The filaments have been deformed from their original cross-sectional shape such that they are tightly packed together without voids. Unlike with previous technologies, no resins or additives are required to fill voids between the filaments or aid in bonding the filaments together, and since the filaments are in close contact with each other very little recrystallized polyethylene content is required to bond the filaments together to form a tape article with adequate mechanical integrity. Without being bound by any particular theory, it is believed that reduction of recrystallized polyethylene content allows for improved strength retention in a tape article formed from a high strength multi-filament yarn. In contrast, currently known tape articles made from multi-filament yarn have significant amounts of recrystallized polyethylene content as a result of the thermal or solvent treatments used in making the tape articles.

Tape articles of the present technology can also be differentiated from currently known tapes by their dimensions, and particularly by their length. For example, many known tapes are described as being formed in discreet or batch processes, such as winding fibers around a metal plate and placing them in a heated press to form consolidated sheets, plaques or panels of specific dimensions. In contrast, tape articles of the present technology can be formed in a continuous process that allows for tape articles having a substantial length. For example, tape articles of the present technology can have a length that is greater than about 1 meter, greater than about 5 meters, or greater than about 10 meters. In some examples, tape articles of the present technology can be up to or greater than 100 meters long, and can be wound onto spools for storage.

Tape articles of the present technology can be compared in use to so-called "prepreg" materials commonly used in the composites industry. Prepregs are frequently made by coating continuous lengths of high strength fibers with a resin to form a pre-impregnated tape article which can be rolled up and stored for future use. The amount of resin used is generally about 10% by weight of the tape article, or more. The prepreg can then be unrolled and formed into a shaped article by a filament winding process, a tape laying process, or other processes. The tape articles of the present technology can be used in a similar fashion since long lengths can be stored for future use and can be formed into simple or complex shapes using known composite manufacturing processes. As with prepregs, tape articles of the present technology can also be formed into woven structures.

While it is possible to form prepregs by coating UHMWPE fibers with a resin, this may not be the most desirable way to form tape articles since UHMWPE exhibits low bond strength with most resins, and as a result the resin content can reduce the strength of a composite structure made with such prepregs. Using the tape articles of the present technology can avoid strength loss due to the use of a bonding resin since such resin is not required. Tape articles of the present technology preferably do not include a bonding resin, or do not include a substantial amount of bonding resin, and also do not include a substantial amount of other additives. Accordingly, tape articles of the present technology can have an UHMWPE content that is close to, or up to about 100% by weight of the tape article. In some examples, tape articles of the present technology can have an UHMWPE content of greater than about 95% by weight of the tape article, or greater than about 98% by weight of the tape article. In some examples, a copolymer can be used with UHMWPE in forming the fibers from which the tape articles of the present technology can be formed. In such examples, tape articles of the present technology can have a fiber content of greater than about 95% by weight of the tape article, or greater than about 98% by weight of the tape article, and preferably have an UHMWPE content that is greater than about 90% by weight of the tape article.

The strength of tape articles of the present technology can be determined by measuring the tenacity of the tape article using ASTM D882-09 at 10 inch (25.4 cm) gauge length and at an extension rate of 100%/min. In some examples, tape articles of the present technology can have a tenacity of less than about 24 g/d (2.07 GPa), about 24 g/d (2.07 GPa), or preferably at least about 24 g/d (2.07 GPa), including but not limited to being at least about 30 g/d (2.58 GPa), or at least about 40 g/d (3.45 GPa).

Tape articles of the present technology can be made by any suitable process. Generally, a process of making a tape article of the present technology can begin with selecting at least one polyethylene multi-filament yarn. The polyethylene multi-filament yarn can have a tenacity of from about 15 g/d (1.29 GPa) to about 100 (8.62 GPa) as measured by ASTM D2256-02 at a 10 inch (25.4 cm) gauge length and at an extension rate of 100%/min. Preferably, the polyethylene multi-filament yarn can also have an intrinsic viscosity (IV) when measured in decalin at 135° C. by ASTM D1601-99 of from about 7 dl/g to 40 dl/g, and/or a c-axis orientation function at least 0.96. The process can include passing said yarn through one or more heated zones at temperatures of from about 100° C. to about 160° C. under tension, and stretching the heated yarn at least once to maintain or increase the strength of the yarn. The process can then include placing the heated, stretched yarn under a longitudinal tensile force, and subjecting the yarn to at least one transverse compression step to flatten, consolidate and compress said yarn at a temperature of from about 100° C. to about 160° C., thereby forming a tape article having a average cross-sectional aspect ratio at least about 10:1. In some examples, after initial formation, the tape article can optionally be stretched at least once at a temperature of from about 130° C. to about 160° C., which may increase the strength of the tape article. The tape article can then be cooled under a longitudinal tensile force to a temperature less than about 70° C. Finally, the finished tape article can be wound onto a package, such as a spool, for storage, or can be conveyed to another process to form a shaped article.

Measurement Methods

Small Angle X-Ray Scattering (SAXS)

One method for conducting small angle x-ray analysis and determining whether a tape article has no long period of less than 450 (Å) is set forth below. In conducting small angle x-ray scattering, any suitable equipment can be used. Suitable equipment must be able to resolve scattering peaks of up to 450 Å.

Two test samples were provided. One test sample was a comparative sample, made from a known tape article sold under the trade name Tensylon®. The other sample was made from a tape article of the present technology. Small angle x-ray scattering was conducted on each test sample using a Rigaku small angle scattering goniometer as an optical bench in a pinhole collimation configuration using two 0.15° pinholes. The goniometer was mounted on a Rigaku DXR3000 generator with a copper (Cu) fine focus x-ray tube operating at 45 kV and 30 mA. The copper (Cu) radiation was monochromized using a nickel (Ni) foil filter. The data was collected using a OED-50-M Location (linear) Sensitive Proportional Counter, made by MBraun GmbH, which was mounted about 330 mm distance from each test sample. For each test sample, a vacuum path 300 mm long was placed between the sample and the detector so as to minimize any scattering of the x-rays by air and was placed as close as possible to the counter. A 1.5 mm wide beam stop was position at the end of the vacuum path as close as possible to the counter.

Each test sample consisted of long strips of the tape article cut in parallel with the machine or tape direction and wound several layers thick in parallel around a sample holder. The length of the strips and the diameter of the holder opening are not significant for this method of using a pinhole collimation, as long as they are larger than the collimated beam, which is less than 1.5 mm in diameter at the sample. However, it is noted that the lengths of the strips used in the measurement described herein were about 2.5 cm, and the width of the sample holder opening was 5 mm. Each test sample was mounted on the small angle goniometer such that the machine direction, also referred to as the meridional direction, was parallel to the detector wire in the OED-50-M counter. The data was collected for 1 to 4 hours. Parasitic scattering around the beam stop was removed from data by collecting a reference data set under the same conditions without a sample, and subtracting the reference data from the data for each test sample after correcting for absorption effects of the sample. The absorption effects due to the amount of sample in the x-ray were measured by measuring the attenuation of the 5.0 ηm diffraction peak of lead stearate with and without a test sample.

Long period can be measured as scattering peaks due to periodical spacing of the crystalline structure, such as lamella of polyethylene. Analysis was conducted to resolve any such scattering peaks from the small angle x-ray scattering data for each test sample, after the parasitic scattering was removed, by profile fitting the data using Jandel Scientific's PeakFit software. The long period peaks were identified as maximums in the intensity data as plotted versus the scattering angle, or as increases in the intensity data above the smoothly and continuously varying intensity that is decreasing with increasing scattering angle, and which can be resolved as a peak with a height and width greater than the statistical noise in the intensity data. The scattering peaks were fitted using a Lorentz peak shape on an exponential shaped background.

The long period of the spacing of the crystalline lamella was determined from the angle of the scattering peak maximum using Bragg's law:

$$d = n\lambda/(2 \sin \theta) \qquad \text{(Equation 1)}$$

where d is the spacing of the long period, n is the order of the reflection, $\lambda$ is the wavelength of the Cu K$\alpha$1,2 emission line, and $\theta$ is the scattering angle.

Figure 3:
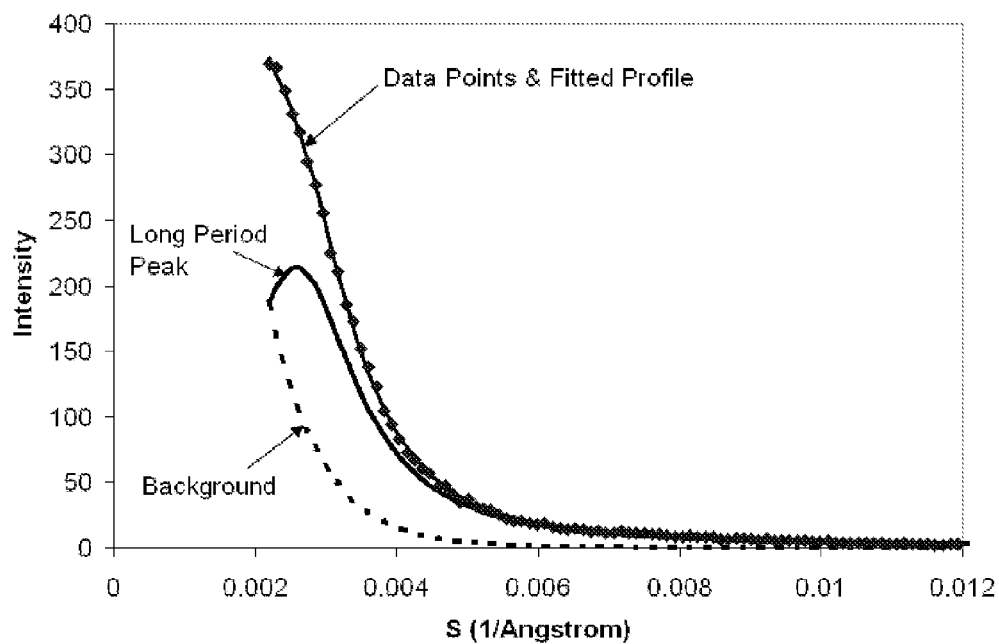
FIG. 3 illustrates meridional SAXS intensity curves for a comparative test sample made from a commercially available tape article.
Figure 4:
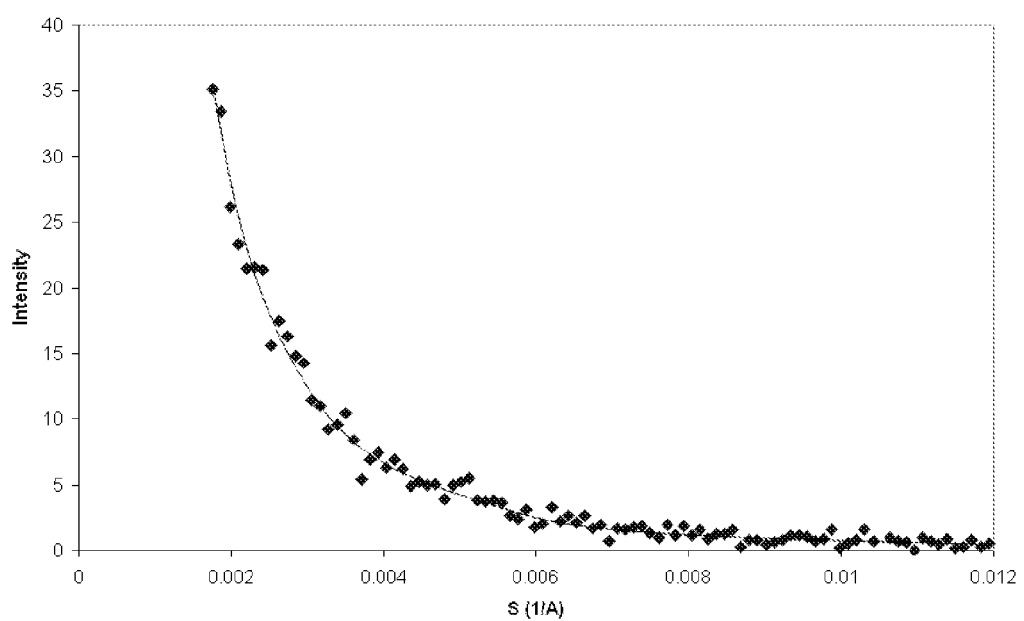
FIG. 4 illustrates meridional SAXS intensity curves for a test sample made from a tape article of the present technology.

FIG. 3 shows meridional SAXS intensity curves for the comparative sample of Tensylon® tape, from which can be resolved a peak indicating an average long period of about 380 Å. FIG. 4 shows meridional SAXS intensity curves for the test sample of a tape article of the present technology, from which no peak can be resolved, thus indicating no long period of less than 450 (Å).

Differential Scanning Calorimetry (DSC) of Tapes

One method for determining the ratio of the low temperature area under the curve (120° C. to Tm-onset) to the total area under the curve (120° C. to 165° C.) is to calculate the ratio from an increasing temperature DSC scan from a temperature of 30° C. to a temperature of 200° C. at a constant rate of 10° C. per minute is described below.

Figure 2:
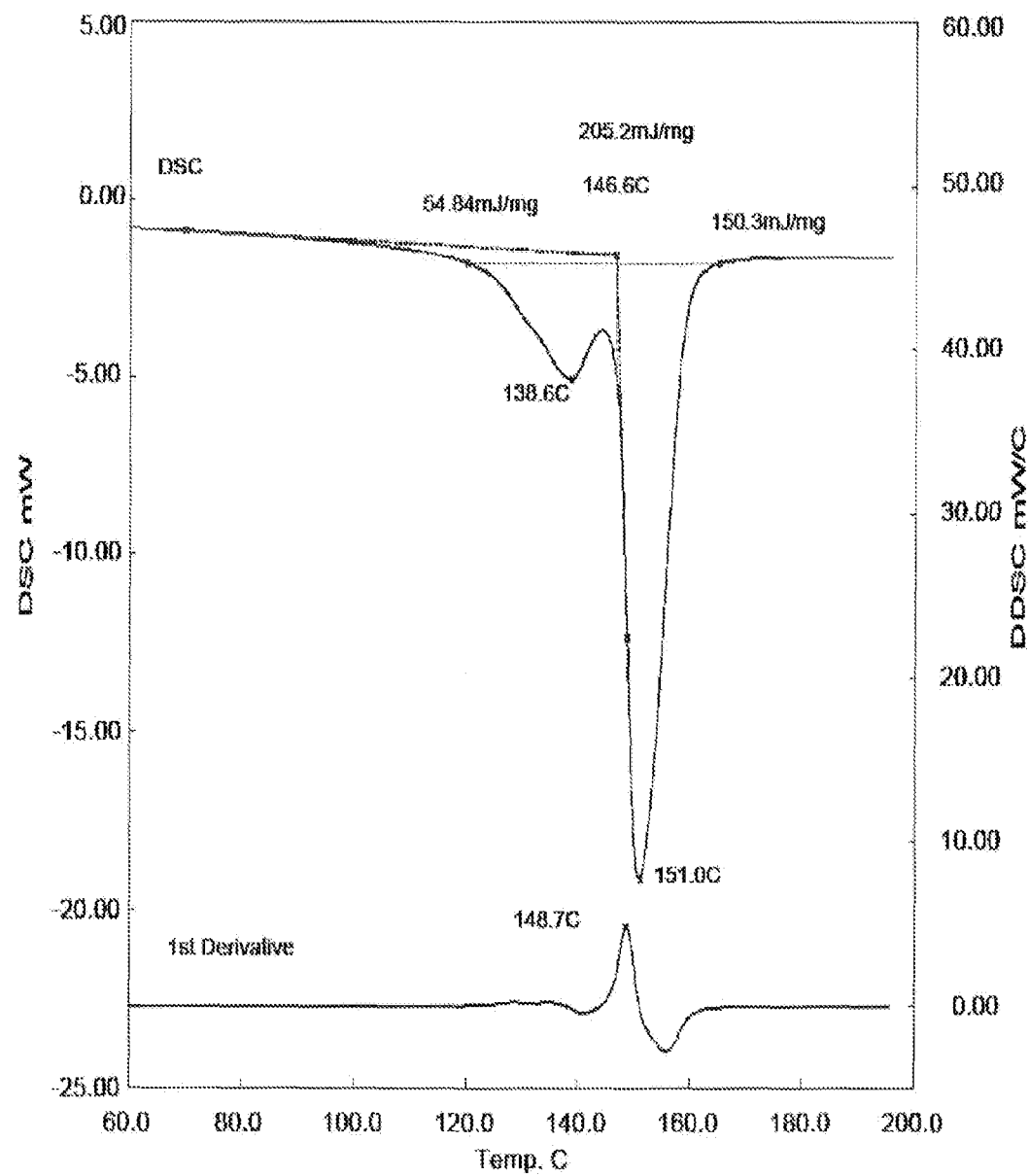
FIG. 2 illustrates DSC data for a comparative test sample made from a commercially available tape article, with the X-axis being the temperature (° C.), the Y-Axis being the DSC mW, and the calculated areas indicated in mJ/mg.

Three test samples were made from tape articles of the present technology and tested. The DSC data for all three test samples is shown in FIG. 1, with the X-axis being the temperature (° C.) and the Y-Axis being the DSC mW. A comparative test sample was made from a tape article sold under the trade name Tensylon® and was also tested. The DSC data for the comparative test sample is shown in FIG. 2.

Each test sample was created by cutting a plurality of specimen from the tape article such that the specimen laid flat on the bottom of an aluminum sample pan and the edges of the specimen did not touch the wall of the aluminum sample pan. Each specimen was less than 5 mm in any dimension, and was specifically from about 3 mm to about 5 mm in any dimension. Multiple specimens of a given tape article were stacked in the pan until the total weight of the specimens was approximately 5 mg, and the stacked specimens were used as the corresponding test sample. The number of specimen that were stacked to create the test sample could vary in order to obtain the desired test sample weight of about 5 mg. A flat aluminum cover for the sample pan was placed on top of the test sample and the edges of the wall on two diametrically opposite sides of the pan were folded over using a fine point tweezers to create two small pinch points in order to hold the cover and the test sample in place. The cover was not placed, and the aluminum sample pan was not crimped or sealed, in a manner that created any pressure on the test sample or that could constrain the test sample while it was heated. An identical empty aluminum sample pan with a cover was prepared as a reference. A temperature increasing DSC scan was collected using a RDC220 DSC manufactured by Seiko Instruments Inc. The DSC data collection began at a temperature of 30° C. and continued as the temperature was increased to 200° C. at a constant rate of 10° C. per minute in a flow nitrogen gas environment.

For each sample, the DSC data was plotted as increasing milliwatt (mW) versus increasing temperature with the direction of the endothermic melting peak or peaks pointing down, typical of a heat flux DSC. The temperature of the largest endothermic peak was recorded along with the temperatures of any other peaks. A baseline was drawn from 120° C. to 165° C., and the area between the baseline and the peak or peaks were measured. The onset of the largest peak, Tm-onset, was determined by the intersection of an extrapolated straight line from the low temperature side of the largest peak at the temperature of its greatest slope, as determined from the maximum in the $1^{st}$ derivative curve, with an extrapolated line fitted from the baseline at 70° C. The area was further segmented by measuring the partial areas of the peaks, even if there was only one peak, using the onset of melting temperature. The low temperature area was calculated between 120° C. and Tm-onset, and the total area was calculated from 120° C. to 165° C. The ratio of the low temperature area to the total area was then calculated. The results for the test samples of the present technology are shown in Table 1 below, with "Area(low)" being the low temperature area and "Area(total)" being the total area.

TABLE 1

| Sample ID | Tm-onset (° C.) | Area (low) (J/g) | Area (total) (J/g) | Area (low)/ Area (total) |
|---|---|---|---|---|
| 1 | 143.3 | 9.72 | 260.1 | 0.037 |
| 2 | 143.9 | 11.92 | 255.5 | 0.047 |
| 3 | 144.2 | 22.25 | 235.8 | 0.094 |

Tape articles of the present technology preferably have low recrystallized polyethylene content, as indicated by a small area under the low temperature peak. This property can be seen in Table 1 above, especially for Sample No. 1 and 2, which each have a ratio of the low temperature area to the total area of less than 0.05. Commercially available UHMWPE tapes have significantly higher ratios of the low temperature area to the total area, for example the comparative test sample shown in FIG. 2 has a ratio of about 0.267.

EXAMPLES

The following examples are presented to provide a more complete understanding of the present technology. The specific techniques, conditions, materials, proportions and reported data set forth to illustrate the principles of the present technology are exemplary and should not be constructed as limiting the scope of the present technology.

Examples 3-8 discussed below were made by the following process. Spectra® yarn was unwound from packages and passed over the surfaces of restraining rolls that transport the yarn at a speed of approximately 1 to 15 meters/minute. The yarn leaving the restraining rolls was heated and stretched in a hot air oven, with the oven temperature being between 100° C. and 160° C., and the stretch ratio being between 1.01:1 to 10:1, with the selected stretch ratio being adequate to obtain the desired yarn strength before compression into a tape article. The heated stretched yarn was then transversely compressed while under a longitudinal tensile force at both the outset and conclusion of compression. The magnitude of the longitudinal tensile force on the yarn at the outset of the compression step was substantially equal to the magnitude of the longitudinal tensile force on the tape article at the conclusion of the compression step. The transverse pressure exerted in the compression step was about 50 to 500 pounds per square inch, with the selected pressure being adequate to deform the yarn filaments such that they were tightly packed together into a substantially void free tape article. The compression step was done at a temperature of 130° C. to 160° C., with the selected temperature being adequate to obtain the desired level of fusion of the yarn without causing a rupture of the yarn or tape article. After the compression step, the formed tape article was maintained at a temperature of 130° C. to 160° C. and was stretched to a selected stretch ration. The selected stretch ratio was adequate to obtain the desired tape article strength. After the tape article stretching step, the tape article was cooled under tension and then passed over the surfaces of pull rolls that transport the tape article at a speed of approximately 2 to 75 meters/minute. It is noted that the difference in the surface speed between the pull rolls and the restraining rolls provides the longitudinal tension in the fiber and in the tape during the stretching steps and the compressing step that occurs between the two sets of rolls. After leaving the pull rolls the tape article was wound up under tension onto a tube package.

Some of the examples of the present technology were made with single ends of yarn, and others were made by combining multiple ends of yarn. Table 2 contains the yarn end count and tape denier, along with the corresponding final tape cross-sectional dimensions

TABLE 2

| Example Number | Number of Yarn Ends | Tape dtex | Tape Width (mm) | Tape Thickness (mm) | Tape Aspect Ratio |
|---|---|---|---|---|---|
| 3 | 1 | 1053 | 3.05 | 0.038 | 80:1 |
| 4 | 6 | 8613 | 11.94 | 0.076 | 157:1 |
| 5 | 1 | 877 | 3.85 | 0.023 | 167:1 |
| 6 | 4 | 3190 | 6.35 | 0.051 | 125:1 |
| 7 | 12 | 19027 | 12.7 | 0.165 | 77:1 |
| 8 | 1 | 660 | | | 100:1 |

Example 1

Comparative

UHMWPE tape made from melt-blown film in accordance with the process described in Takashi Nakahara et al., "Ultra High Molecular Weight Polyethylene Blown Film Process", ANTEC 2005, 178-181 (2005), was slit and drawn, having a cross-sectional aspect ratio of 60.5:1, a tenacity of 13.1 g/d (1.13 GPa), a DSC low temperature area ratio of 0.210, and a long period of 331 Angstroms by x-ray analysis.

Example 2

Comparative

Tensylon® tape, made from UHMWPE powder that was consolidated under pressure into a film that was slit and drawn, having a cross-sectional aspect ratio of 40.5:1, a tenacity of 19.3 g/d (1.66 GPa), a DSC low temperature area ratio of 0.290, and a long period of 380 Angstroms by x-ray analysis.

Example 3

UHMWPE tape was made from Spectra® multi-filament yarn with 240 filaments, having a cross-sectional aspect ratio of 80:1:1, a tenacity of 33.0 g/d (2.84 GPa), a DSC low temperature area ratio of 0.048, and no long period by x-ray analysis.

Example 4

UHMWPE tape was made from Spectra® multi-filament yarn with a total of 1440 filaments, having a cross-sectional aspect ratio of 157:1 and tenacity of 31.5 g/d (2.71 GPa) and a DSC low temperature area ratio of 0.037.

Example 5

UHMWPE tape was made from Spectra® multi-filament yarn with 240 filaments, having a cross-sectional aspect ratio of 167:1 and a tenacity of 40.9 g/d (3.52 GPa), and expected to have a DSC low temperature area ratio of less than 0.035.

Example 6

UHMWPE tape was made from Spectra® multi-filament yarn with a total of 960 filaments, having a cross-sectional aspect ratio of 125:1, a tenacity of 28.0 g/d 2.41 GPa), and a DSC low temperature area ratio of 0.120.

Example 7

UHMWPE tape was made from Spectra® multi-filament yarns with a total of 5760 filaments, having a cross-sectional aspect ratio of 77:1 a tenacity of 30.0 g/d (2.59 GPa), and a DSC low temperature area ratio of 0.094.

Example 8

UHMWPE tape is made from Spectra® multi-filament yarns with a total of 240 filaments, having a cross-sectional aspect ratio of 100:1, a tenacity of 50.0 g/d (4.31 GPa), a DSC low temperature area ratio of less than 0.030, and having no long period by x-ray analysis.

Example 9

A tape article of the present technology is made with variable fiber consolidation along its length, such that there is a repeating pattern of highly-consolidated substantially void-free one inch long tape sections and less-consolidated porous one inch long tape sections.

Example 10

A tape article of the present technology as described in Example 5 is woven into a basket weave fabric.

Example 11

Laminates can be formed from using tape articles of the present technology that include two or more unidirectional layers of the tape articles with the tape direction in adjoining layers being rotated from each other by from about 15 to 90 degrees. In one such example, a tape article of the present technology as described in Example 5 is wound up in a multiplicity of packages and the packages are placed on a creel. Multiple ends of the tape articles, unwound from the creel, aligned parallel in lateral contact, are place on a carrier web consisting of a high density polyethylene (HDPE) film of 0.00035 cm thickness. The carrier web and tape articles are passed through heated nip rolls under pressure to adhere the tape articles to the carrier web. The carrier web and adhering parallel tape articles are wound up in two rolls. The two rolls are fed into a cross-plying apparatus as described in U.S. Pat. No. 5,173,138, wherein the webs containing the tape articles are cross-plied and consolidated by means of heat and pressure. A four layer laminate is thereby formed where the layers, in sequential order through the laminate are HDPE-tape articles-tape articles-HDPE, and the direction of the tapes in adjacent layers are at right angles to one another. The laminate is then rolled up.

Example 12

Basket weave fabrics as described in Example 10 are plied up and loosely connected to form an assembly of the present technology having an areal density of 1.5 Kg/m2. It is expected that the assembly has a specific energy absorption at least about 500 J-m2/Kg against a 9×19 mm FMJ Parabellum bullet as measured by MIL.-STD. 662F.

Example 13

Laminates as described in Example 11 are plied up and consolidated to form an impact and penetration resistant composite article having an areal density of 1.5 Kg/m2. It is expected that the composite article has a specific energy absorption at least about 500 J-m2/Kg against a 9×19 mm FMJ Parabellum bullet as measured by MIL.-STD. 662F.

Example 14

Laminates as described in Example 11 and Basket weave fabrics as described in Example 10 are plied up and consolidated to form an impact and penetration resistant composite article having an areal density of 1.5 Kg/m2. It is expected that the composite article has a specific energy absorption at least about 500 J-m2/Kg against a 9×19 mm FMJ Parabellum bullet as measured by MIL.-STD. 662F.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter

What is claimed is:

1. A tape article made from ultra-high molecular weight polyethylene multi-filament yarn, the tape article comprising:
   an average cross-sectional aspect ratio of at least about 10:1; and
   a ratio of the low temperature area under the curve (120° C. to Tm-onset) to the total area under the curve (120° C. to 165° C.) of less than about 0.15 as measured by an increasing temperature DSC scan from a temperature of 30° C. to a temperature of 200° C. at a constant rate of 10° C. per minute.

2. The tape article of claim 1, wherein the tape article has a tenacity of at least about 24 g/d (2.07 GPa) when measured by ASTM D882-09 at a 10 inch (25.4 cm) gauge length and at an extension rate of 100%/min, and wherein said average cross-sectional aspect ratio is at least about 50:1.

3. The tape article of claim 2, wherein the tape article has no long period of less than 450 Angstroms (Å) when measured by small angle x-ray analysis.

4. The tape article of claim 1, wherein the tape article has no long period of less than 450 Angstroms (Å) when measured by small angle x-ray analysis.

5. The tape article of claim 1, wherein the tape article is formed from one ultra-high molecular weight polyethylene multi-filament yarn and wherein the tape article has a tenacity of at least about 30 g/d (2.59 GPa).

6. The tape article of claim 1, wherein the tape article has a tenacity of at least about 40 g/d (3.45 GPa).

7. The tape article of claim 1, wherein the ratio of the low temperature area under the curve (120° C. to Tm-onset) to the total area under the curve (120° C. to 165° C.) of less than about 0.05 as measured by the increasing temperature DSC scan from a temperature of 30° C. to a temperature of 200° C. at a constant rate of 10° C. per minute.

8. The tape article of claim 1, wherein the tape article is void free and has an ultra-high molecular weight polyethylene content of 100% by weight of the tape article.

9. The tape article of claim 1, wherein the tape article has an ultra-high molecular weight polyethylene content by weight of greater than 95%.

10. The tape article of claim 1, wherein the tape article has an ultra-high molecular weight polyethylene content by weight of greater than 98%.

11. The tape article of claim 1, wherein the tape article has an average cross-sectional aspect ratio of at least about 100:1.

12. The tape article of claim 1, wherein the tape article has an average cross-sectional aspect ratio of at least about 1000:1.

13. The tape article of claim 1, wherein the tape article has thickness less than 2 mils (0.05 mm), and consists of a twisted ultra-high molecular weight polyethylene multi-filament yarn having less than about 3 turns of twist per inch of length.

14. The tape article of claim 1, wherein the tape article has a constant cross-sectional aspect ratio along its length.

15. The tape article of claim 1, wherein the tape article has a variable cross-sectional aspect ratio that changes randomly or at a selected frequency along its length.

16. The tape article of claim 1, wherein the tape article has a variable level of fiber consolidation along its length, with consolidation changing randomly or at a selected frequency.

17. A tape article made from ultra-high molecular weight polyethylene gel-spun, multi-filament yarn, the tape article comprising:
   an average cross-sectional aspect ratio of at least about 50:1;
   a tenacity at least about 24 g/d (2.07 GPa) when measured by ASTM D882-09 at a 10 inch (25.4 cm) gauge length and at an extension rate of 100%/min;
   and a ratio of the low temperature area under the curve (120° C. to Tm-onset) to the total area under the curve (120° C. to 165° C.) of less than about 0.15 as measured by an increasing temperature DSC scan from a temperature of 30° C. to a temperature of 200° C. at a constant rate of 10° C. per minute,
   wherein the tape article has an ultra-high molecular weight polyethylene content of greater than 98% by weight.

* * * * *